Sept. 10, 1935. R. E. WILSON Re. 19,701
HEAT EXCHANGER
Original Filed Jan. 22, 1927 4 Sheets-Sheet 1
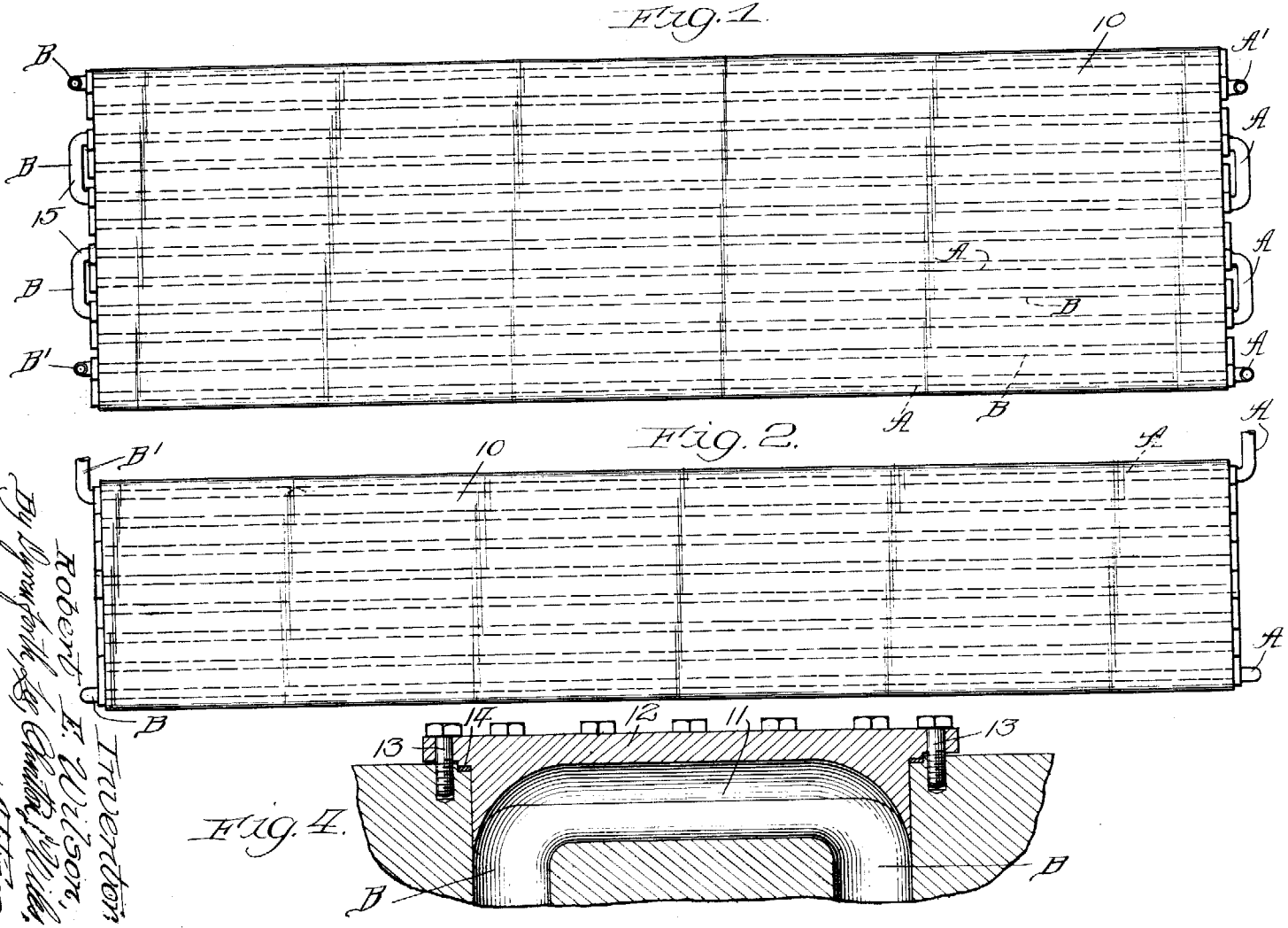
Inventor
Robert E. Wilson,
By Dyrenforth, Lee, Christy & Wiles,
Attys.

Sept. 10, 1935. R. E. WILSON Re. 19,701

HEAT EXCHANGER

Original Filed Jan. 22, 1927 4 Sheets-Sheet 2

Inventor:
Robert E. Wilson,
By Dyrenforth, Lee, Christy, Miles,
Attys.

Sept. 10, 1935. R. E. WILSON Re. 19,701

HEAT EXCHANGER

Original Filed Jan. 22, 1927 4 Sheets-Sheet 3

Inventor:
Robert E. Wilson,
By Dyrenforth, Lee, Christy & Wiles,
Attys.

Sept. 10, 1935. R. E. WILSON Re. 19,701
HEAT EXCHANGER
Original Filed Jan. 22, 1927 4 Sheets-Sheet 4
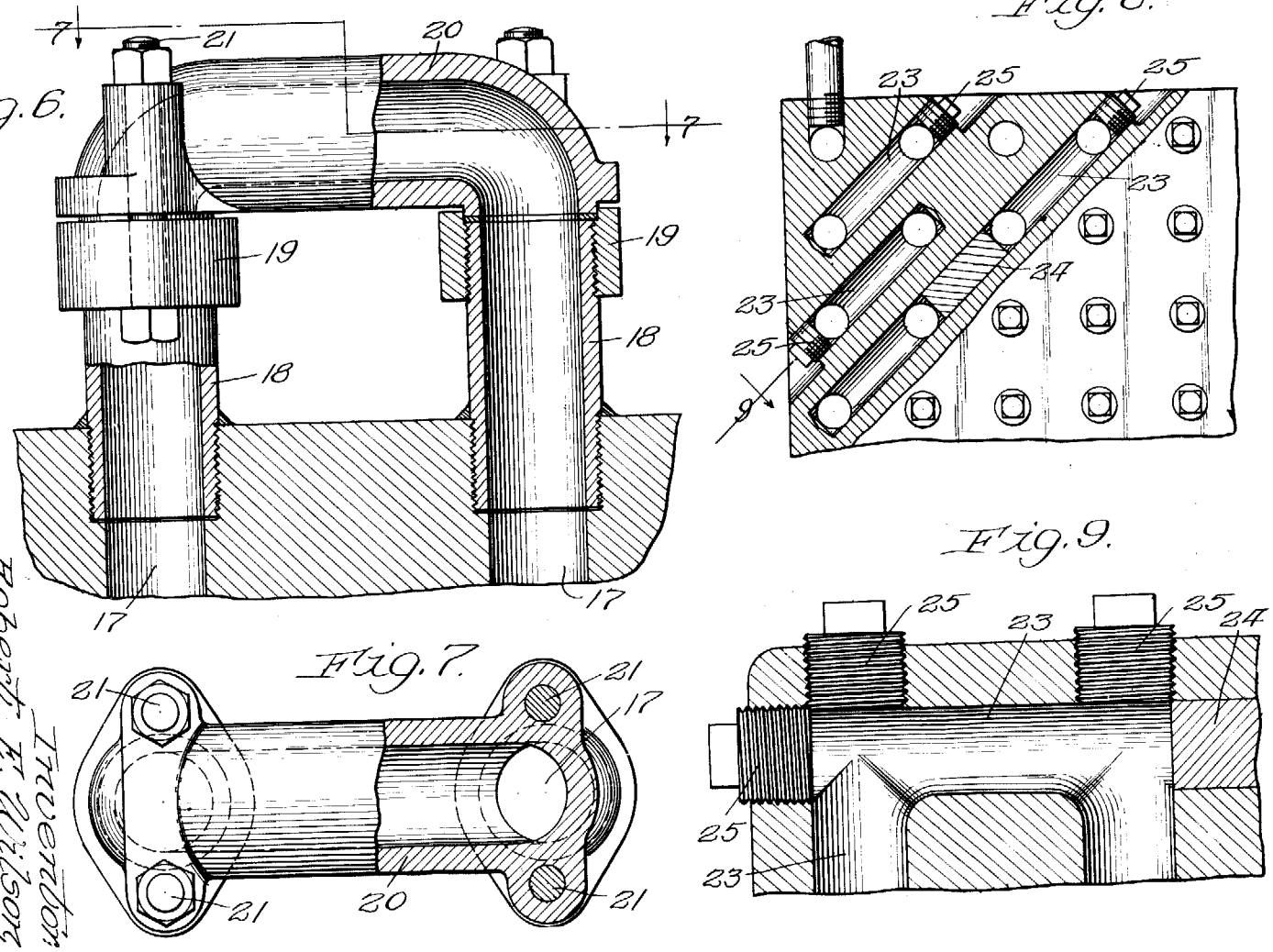
Inventor:
Robert E. Wilson
By Dyrenforth, Lee, Christy & Miles,
Attys.

Reissued Sept. 10, 1935 Re. 19,701

UNITED STATES PATENT OFFICE 19,701

HEAT EXCHANGER

Robert E. Wilson, Chicago, Ill., assignor to Standard Oil Company, Whiting, Ind., a corporation of Indiana Original No. 1,737,347, dated November 26, 1929, Serial No. 162,740, January 22, 1927. Application for reissue August 7, 1931, Serial No. 555,838

8 Claims. (Cl. 257—240)

This invention relates to improvements in heat exchangers and more especially to such an exchanger adapted for exchanging, transferring, or conducting heat from one fluid to another under such conditions that accessibility and ease of cleaning are important, and where the pressure may be high.

For example, in the treating of oils, it frequently is necessary to heat one oil and cool another at the same time. Obviously, this can be done with the greatest efficiency by transferring the heat from the oil to be cooled to the one to be heated. One of the objects of my invention is to accomplish this transfer of heat with the slightest loss possible.

Although I show and describe a device especially adapted for the use of oil in both circulatory systems, it is to be understood that any other fluids may be used, without detracting from the spirit of my invention.

In devices of this character, it is frequently necessary or desirable to clean the circulatory systems of the two fluids. For example, in the cooling or heating of either of the fluids there is often deposited a film or coating of substance that eventually interferes with the conduction of heat unless the same is removed. If the circulatory systems are tubular and composed of straight lengths of tubes, the ends of which can be opened, the cleaning is rather easily accomplished. In many heat exchangers heretofore used, however, although one of such systems was tubular the other in most cases was not. One of the features of my invention is to make both systems tubular. That is, the system carrying the oil to be cooled and the oil to be heated are both tubular. Each system is also composed of straight lengths, the ends of which can be opened in order to permit the ready insertion and operation of well known brushes and cleaning tools.

Another feature of my invention, besides providing two tubular circulatory systems, is the provision of a continuous or solid metal conductor between such systems. It is well known that metal is a very good conductor of heat; and I have produced great efficiency in my improved device by using solid or continuous metal as a conductor between the two systems, without the interposition of any other medium. This also makes it possible to operate at high pressures.

Other features and advantages of my invention will appear more fully as I proceed with my specification.

Figure 3:
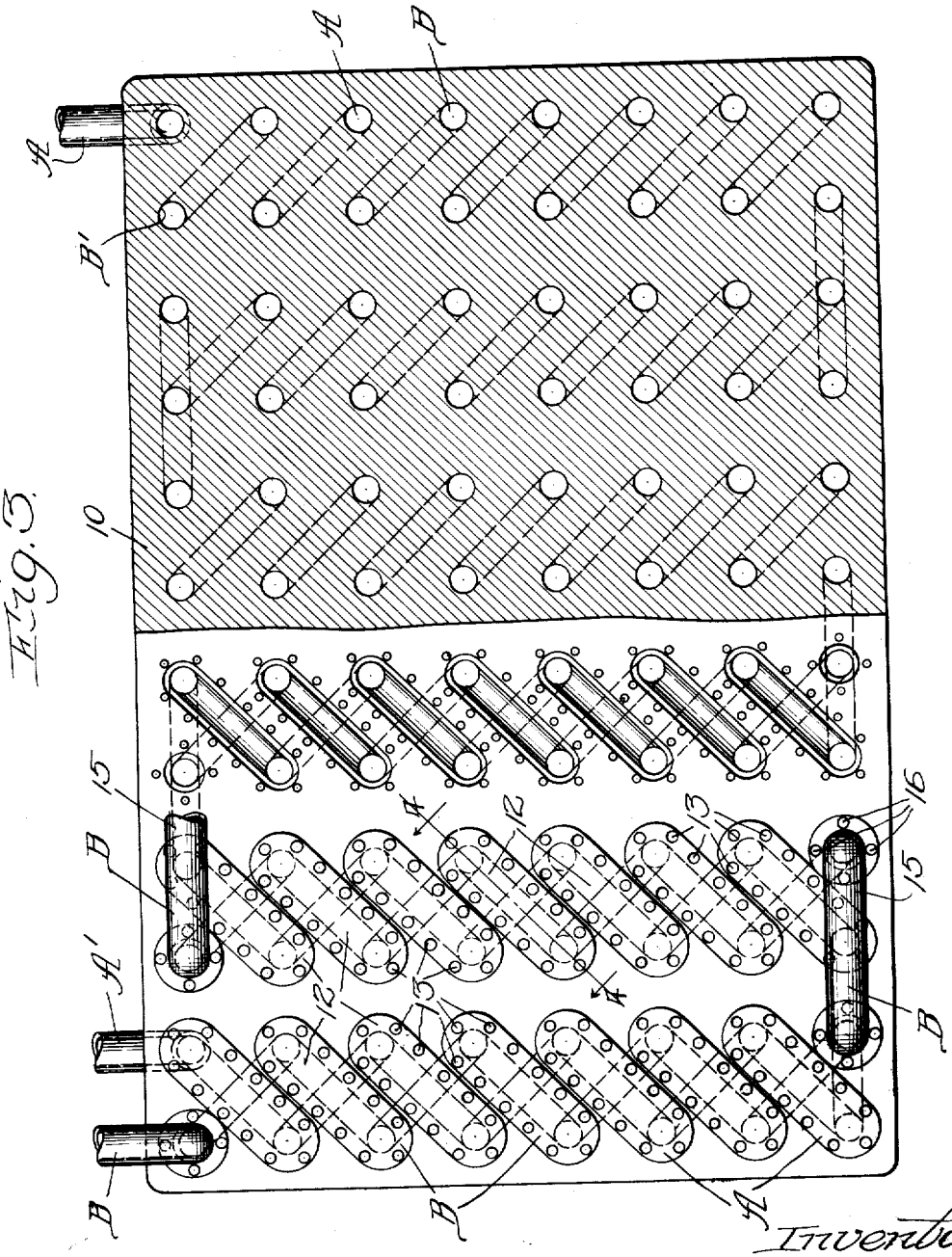
Figure 5:
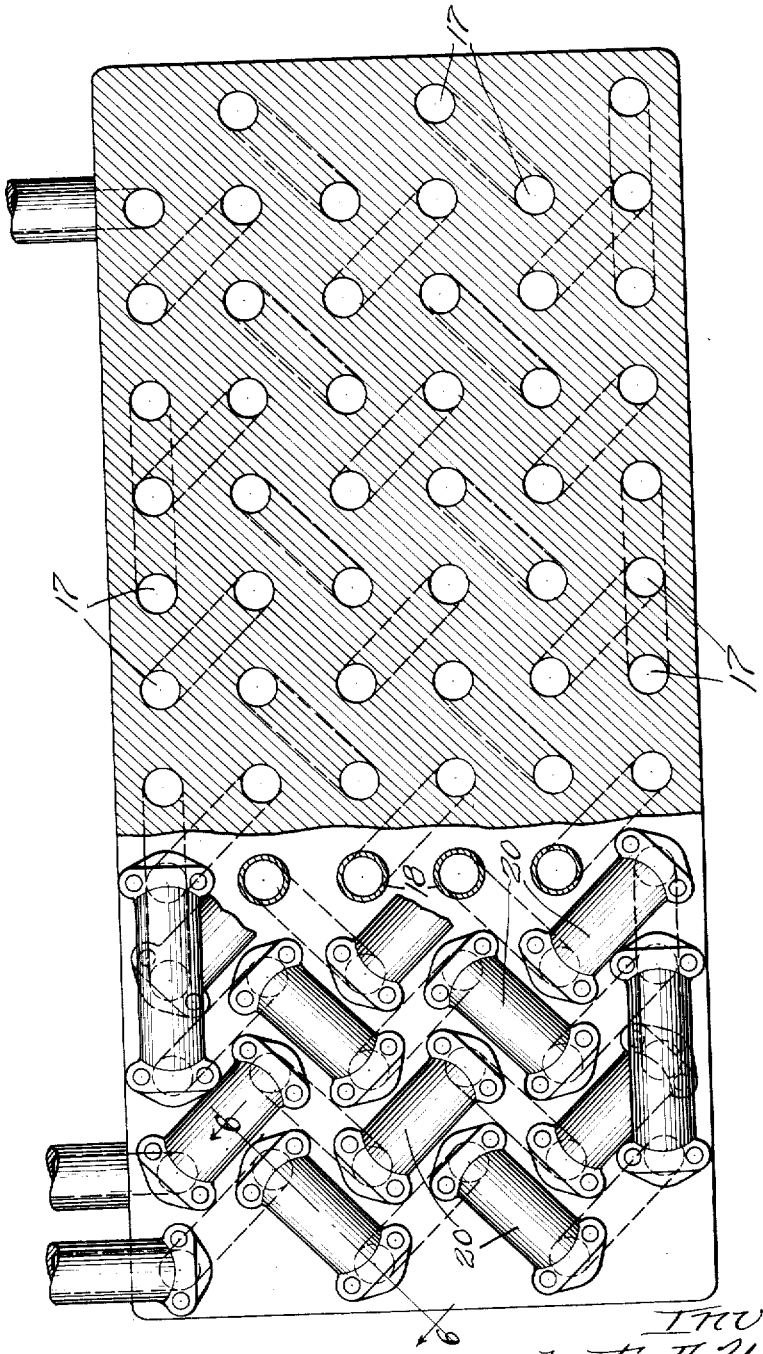

In that form of device embodying the features of my invention shown in the accompanying drawings, Fig. 1 is a top plan view of my improved heat exchanger, Fig. 2 is a similar view in side elevation, Fig. 3 is a view partly in end elevation and partly in section, Fig. 4 is a view taken as indicated by the line 4—4 of Fig. 3, Fig. 5 is a view similar to Fig. 3 showing a modified form, Fig. 6 is a view taken as indicated by the line 6—6 of Fig. 5, Fig. 7 is a view taken as indicated by the line 7—7 of Fig. 6, Fig. 8 is a fragmentary view similar to Figs. 3 and 5, showing a modified form, and Fig. 9 is a view taken as indicated by the line 9 of Fig. 8.

As shown in the accompanying drawings, 10 indicates a solid billet, of iron, steel, or other suitable metal which contains the two circulatory systems. Each of the circulatory systems comprises a plurality of straight passes or runs of tubular holes drilled or otherwise formed through the billet. Means are provided for connecting the ends of these straight passes in order to form two complete circulatory systems, one for the cold oil and one for the hot. The straight passes are preferably connected so that each pass of hot oil is close to a pass of cold oil, and preferably the flows in the two systems are approximately counter-current. It will be seen that since the passes in each system are straight and have their ends open, these passes or tubular holes may be easily and simply cleaned when the end connections are removed. Consequently, the means for connecting the passes at the ends are made removable to permit such cleaning.

Instead of using a solid billet of iron, steel or other metal, the heat exchanger may be constructed by providing the two circulatory systems with straight passes or runs of pipes and casting a metal around them. In such construction, the metal thus employed, for example lead, might be liquid at the operating temperature.

The ends of the passes or tubes may be connected in a variety of ways in order to make the two circulatory systems. For example, as shown in Figs. 1 to 4 inclusive, I have indicated the two circulatory systems in general by A and B. For example, A may indicate the inlet for the hot oil and A' the outlet, and B the inlet for the cold oil and B' its outlet. It will be seen that throughout the billet, alternate straight passes of the A and B systems are adjacent. As shown in Figs. 1 to 4 inclusive, the ends of the tubular passes or runs are connected by milling out a portion of the end of the billet as indicated by 11 (see Fig. 4) to connect the ends of two adjacent tubes, and the cavity thus milled out is closed by a rectangular shaped plate 12 suitably fastened in place in any manner, as by means of the machine screws 13. A a gasket 14 is preferably provided in order to prevent leakage. In cases where two of the connections must cross over as indicated by 15, instead of milling out and using a plate 12, a U-pipe 15 may be provided as shown, which may be suitably fastened in place by means of the machine screws 16. Such a U-pipe 15 will bridge over the underlying plate 12 and thus serve to connect the ends of the tubes.

In Figs. 5, 6 and 7 I have shown another method of connecting the ends of tubes. For example, (see Fig. 6) the ends of two tubes as indicated by 17, 17 may be connected by providing the two nipples 18, 18 threaded into the ends thereof. Each of the nipples 18 carries a collar 19 threaded on the end, and a U-tube 20 is provided to connect the ends of the nipples, the same being held in position by the bolts 21 engaging the collars 19. Gaskets 22 are provided to prevent leakage.

In Figs. 8 and 9 I have shown another method of connecting the ends of tubes. As here shown, diagonal holes 23 are drilled across the ends of the billet intersecting the longitudinal holes a short distance from the surface. The alternate spaces between the ends of the longitudinal holes are plugged with solid bars 24, welded or otherwise suitably fastened in place. The ends of both diagonal and longitudinal holes are closed by screw plugs 25.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. In a device of the character described, a solid metal billet provided with two sets of straight tubular passes therethrough, and means for connecting the ends of the passes of each set to form a circulatory system, said connecting means comprising recesses in said billet joining the ends of the passes to be connected and removable plates over said recesses.

2. In a heat exchanger, a block formed of metal, a plurality of parallel series of parallel pipes extending in the block, means connecting the pipes in each series to form separate adjacent continuous conduits, and inlets on opposite ends of said adjacent conduits.

3. In a heat exchanger, a block formed of metal and having a plurality of parallel bores, pipes extending into the bores and imbedded in the block, and means connecting selected pipes in series to form separate continuous conduits.

4. In combination with flow lines for hot and cold fluids respectively, a heat exchanger including a block having a plurality of parallel bores, means connecting adjacent ends of selected bores to form a pair of continuous conduits, and means for effecting movement of said fluids in opposite directions through the conduits including means for connecting the flow lines respectively to opposite ends of said conduits.

5. A heat exchanger including a block having a series of bores connected to form a conduit, inlet and outlet lines connected to the conduit, a second series of bores provided in said block, each adjacent and substantially parallel to one of said first named bores and connected to form a second conduit, and inlet and outlet lines connected to said second named conduit in reverse relation to the inlet and outlet lines of the first named conduit.

6. A heat exchanger including in combination with flow lines for hot and cold fluids respectively, a block having a plurality of substantially parallel series of bores including inlet and outlet bores at opposite ends of each of said series, means connecting adjacent ends of selected pairs of bores to form a pair of conduits respectively for hot and cold fluids, and means connecting said inlet and outlet bores with the flow lines for circulating said fluids in opposite directions through the conduits.

7. A heat exchanger including a block, a series of parallel pipes embedded in the block and connected to form a conduit having an inlet at one end of the block, a second series of parallel pipes embedded in the block adjacent the first named series and connected to form a conduit having an inlet at the opposite end of the block, and means for circulating fluids in opposite directions through the conduits.

8. A heat exchanger comprising an elongated body of metal having separate fluid passages of uniform circular cross section extending lengthwise entirely through said body, said passages being of substantially equal diameter, and means for supplying fluids to said separate passages, said passages being disposed side by side whereby heat may be exchanged from the fluid in one passage to the fluid in another passage through the metal between said passages.

ROBERT E. WILSON.